D. BALSHAW.
SAFETY NUT LOCK.
APPLICATION FILED AUG. 16, 1917.
1,285,898. Patented Nov. 26, 1918.
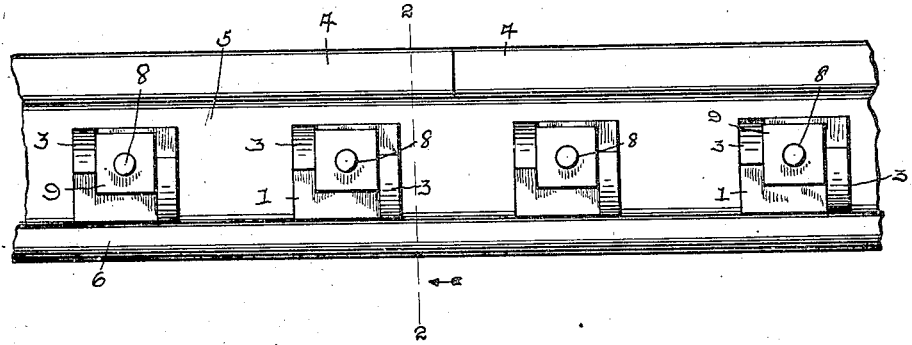
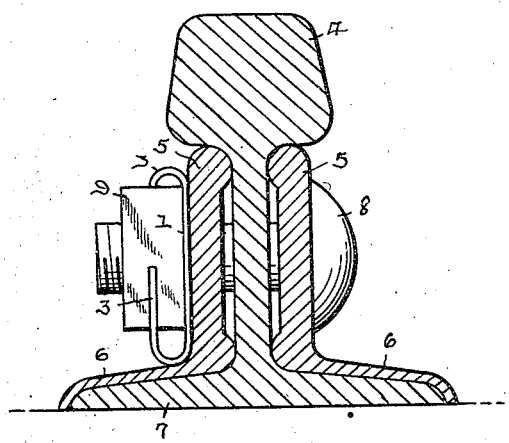
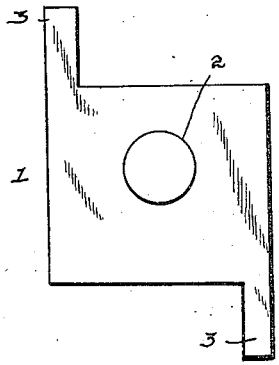
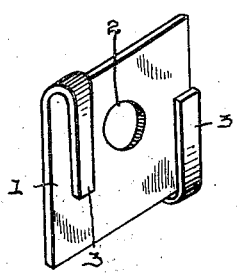
INVENTOR
David Balshaw
By
W. J. FitzGerald & Co.
ATTORNEYS

UNITED STATES PATENT OFFICE.

DAVID BALSHAW, OF SULPHUR, LOUISIANA.

SAFETY NUT-LOCK.

1,285,898. Specification of Letters Patent. Patented Nov. 26, 1918.

Application filed August 16, 1917. Serial No. 186,466.

*To all whom it may concern:*

Be it known that I, DAVID BALSHAW, a citizen of the United States, residing at Sulphur, in the parish of Calcasieu and State of Louisiana, have invented certain new and useful Improvements in Safety Nut-Locks; and I do hereby declare the following to be a full, clear, and exact description of the invention, such as will enable others skilled in the art to which it appertains to make and use the same.

This invention relates to new and useful improvements in nut locks and particularly one designed for use in connection with railroad joints.

The primary object of the invention is to provide a nut lock of this character which is of cheap and inexpensive construction, which can be quickly and readily applied in an operative position so as to reliably maintain the nut in the tightened or locked position against casual loosening.

With these and other objects in view as will appear as the description proceeds, the invention comprises the various novel features of construction, combination and arrangements of parts as will be more fully described hereinafter and set forth with particularly in the appended claims.

Referring to the drawings:

Figure 1 is a side elevation of a railroad joint showing my improved nut lock attached thereto in an operative position.

Fig. 2 is a vertical transverse sectional view taken on the line 2—2 of Fig. 1.

Fig. 3 is a top plan view of the nut lock as it appears prior to its application, and Fig. 4 is a detail perspective view of the nut lock with the tongues bent into an operative position.

Similar characters of reference are used to denote corresponding parts throughout the following description and the accompanying drawings.

Referring more particularly to the drawings, and particularly to Fig. 3, it will be seen that my improved construction of nut lock is formed from a sheet of pliable metal and embodies a substantially square body portion 1 provided intermediate its ends and adjacent its top edge with an aperture 2 for the reception of the rail bolt.

Body portion 1 is provided with opposite sides and at diagonally opposite corners with outwardly extending tongues 3.

The reference numeral 4 indicates the meeting ends of a pair of rails which have positioned on opposite sides, angular fish plates 5 that are each provided in this instance with a base flange 6 adapted to overlie the base flange 7 of the rail 4. Bolts 8 extend transversely through the fish plates and the web of the rail and are each provided with a nut 9.

When it is desired to attach the nut lock in an operative position, the body portion 1 is positioned over the end of the bolt 8 until it rests against the adjacent fish plate 5 so that the lower edge of the body portion will rest upon the base flange 6 of the fish plate and serve to prevent any tendency of the nut lock to rotate on the bolt. The body portion having been so positioned, the nut 9 is drawn up on the bolt tightly against the body portion 1 until the top and bottom edges of the nut are disposed in parallel planes with the top and bottom edges of the body portion. The oppositely extending tongues 3 are then bent inwardly and in overlapping relation with respect to the body portion 1 so as to embrace and lie on opposite sides of the nut, as clearly shown in Figs. 1 and 2. When the nut lock has been so positioned, it will be apparent that it will be impossible for the nut to casually rotate or to become loosened.

Should it be desired to remove the nut, the oppositely extending tongues 3 can be readily bent away from the opposite sides of the nut so that the latter can be freely rotated.

I claim:

1. As an article of manufacture, a nut locking washer formed from a sheet of pliable material, and consisting of an angular apertured body portion having a straight bearing edge and tongues projecting in opposite directions from the diagonal opposite corners of said body portion.

2. In a nut lock, the combination of a nut and bolt, a locking washer formed of a sheet of pliable metal and having an angular apertured body portion with a straight bearing edge to engage a base, and tongues projecting in opposite directions from the diagonal opposite corners of said body portion and bent inward to lie parallel to and in spaced relation to the body of the plate for engagement with the diagonal opposite corner of the nut.

In testimony whereof I have signed my name to this specification in the presence of two subscribing witnesses.

DAVID BALSHAW.

Witnesses:
 Jos. Doland,
 Jeff Simmons.